US012605772B2

(12) United States Patent
Yeung

(10) Patent No.: US 12,605,772 B2
(45) Date of Patent: Apr. 21, 2026

(54) SYSTEM FOR LASER PRINTING AND HOLE DRILLING ON A BUILDING SURFACE

(71) Applicant: YOUNG'S ENGINEERING CO. LTD., Kowloon (HK)

(72) Inventor: Tak Ki Yeung, Kowloon (HK)

(73) Assignee: YOUNG'S ENGINEERING CO. LTD., Kowloon (HK)

( * ) Notice: Subject to any disclaimer, the term of this patent is extended or adjusted under 35 U.S.C. 154(b) by 480 days.

(21) Appl. No.: 18/219,269

(22) Filed: Jul. 7, 2023

(65) Prior Publication Data

US 2024/0300032 A1 Sep. 12, 2024

(30) Foreign Application Priority Data

Mar. 10, 2023 (HK) ............................ 22023069843.7

(51) Int. Cl.
| | |
|---|---|
| *B23B 49/00* | (2006.01) |
| *B23K 26/082* | (2014.01) |
| *B41M 5/00* | (2006.01) |
| *B41M 5/26* | (2006.01) |
| *B66F 11/04* | (2006.01) |
| *G05B 13/02* | (2006.01) |
| *G06T 7/73* | (2017.01) |
| *G06V 10/40* | (2022.01) |

(Continued)

(52) U.S. Cl.
CPC ............ *B23B 49/00* (2013.01); *B23K 26/082* (2015.10); *B41M 5/26* (2013.01); *B66F 11/04* (2013.01); *G05B 13/027* (2013.01); *G06T 7/73* (2017.01); *G06V 10/40* (2022.01); *G06V*

*10/764* (2022.01); *G06V 10/774* (2022.01); *G06V 10/776* (2022.01); *G06T 2207/20081* (2013.01)

(58) Field of Classification Search
CPC ......... B23B 49/00; B23K 26/082; G06T 7/73; G06V 10/40; G06V 10/774; G06V 10/776; G06V 10/764; B41M 5/26; B66F 11/04; G05B 13/027
See application file for complete search history.

(56) References Cited

U.S. PATENT DOCUMENTS

| | | | |
|---|---|---|---|
| 2022/0011104 A1* | 1/2022 | Kahle | ................... G01C 15/002 |
| 2022/0028125 A1* | 1/2022 | Gould | .................... G06T 11/00 |

(Continued)

FOREIGN PATENT DOCUMENTS

| | | | | |
|---|---|---|---|---|
| CN | 217345469 U | * | 9/2022 | |
| WO | WO-2022012262 A1 | * | 1/2022 | .............. B25J 11/00 |

*Primary Examiner* — Mark A Connolly
(74) *Attorney, Agent, or Firm* — WPAT, PC

(57) ABSTRACT

A printing and drilling system for printing and drilling a target on a building surface that includes a supporting unit for supporting omni-directionally the printing and drilling unit, which has a number of laser position units for illuminating a working area containing the target, an imaging unit to capture images of the working area, a control unit to process the captured images, determine location coordinates of the target, and generate drilling data associated with the target, a laser generator for emitting a laser beam, a laser printing unit movable in x and y axes directions for emitting the laser beam to print the target, and a laser path reflector in the laser printing unit that can focus the laser beam in sequence for printing the target, and an electric drill unit movable from one position to another position for drilling an anchor hole on the laser-marked target.

23 Claims, 5 Drawing Sheets

(51) Int. Cl.
    *G06V 10/764*         (2022.01)
    *G06V 10/774*         (2022.01)
    *G06V 10/776*         (2022.01)

(56)              References Cited

U.S. PATENT DOCUMENTS

| | | | |
|---|---|---|---|
| 2024/0167817 A1* | 5/2024 | Savikovsky | G01C 15/006 |
| 2024/0411949 A1* | 12/2024 | Jung | G06F 30/12 |
| 2025/0298929 A1* | 9/2025 | Pitscheider | G06F 30/13 |

* cited by examiner

10

SYSTEM FOR LASER PRINTING AND HOLE DRILLING ON A BUILDING SURFACE

FIELD

The present disclosure relates to a system for printing and drilling on a building surface (e.g., overhead walls or ceiling slabs). More specifically, to a laser printing and hole drilling unit for printing a target on the building surface, and then drilling an anchor hole on the laser-marked target, thereby allowing an operator to perform the printing and drilling work with ease and safety.

BACKGROUND

During the construction of a building, a framework of the building is first put up, and the walls and ceiling slabs are next installed. In order to secure mechanical parts and for service purposes of mechanical, electrical and plumbing (MEP) services, holes or recesses on the wall surfaces and ceilings have to be marked, drilled and anchored at the predetermined positions. The printing, drilling and/or anchoring work, particularly the overhead printing and drilling work on the ceiling slabs, is considered as an awkward, monotonous and laborious process, and also requires a substantial amount of time, because printing and drilling on the overhead surfaces, for example ceiling soffits, needs auxiliary means such as ladders, base frames, stands, scissor platforms and the like and may be adjusted or scaled many times at different positions of the worksite. In addition, there is a falling risk of operators who carry out the printing and drilling work on the auxiliary means at the worksite.

Conventionally, building information modeling (BIM) is a digital representation of physical and functional characteristics of a facility, which is an engineering data model incorporated with information about various aspects and resources of the facility, while Robotic Total Station (RTS) is designed for automatically measuring of slant distances, horizontal and vertical angles and elevations in topographic and geodetic works, tachometric surveys, as well as for solution of application geodetic tasks. In the present disclosure, the RTS is used to pinpoint all anchor positions with a high degree of accuracy on each soffit basing on the BIM.

Machine vision is a technology used to provide imaging based automatic inspection and analysis for such applications as automatic inspection, process control and robot guidance in industry. Generally, machine vision includes a combination of hardware and software which, for example, perform objective measurements, such as providing location information to devices in the execution of their functions based on the capture and processing of images.

Deep learning techniques are gaining wide popularity in a variety of application and research areas. Deep learning is one branch of machine learning and includes statistics and predictive modeling, which is a helpful analysis tool to interpret quickly a large amount of data. A deep learning model is trained before it is deployed for its intended application. The deep learning model is trained by feeding it data for which correct answers or responses are known. Typically, the more training data that is used to train the deep learning system, the better the training results become.

In a design model using the BIM technology for MEP installations in combination with the RTS and the machine vision technology, the need of doing the printing, drilling, and anchoring operations in tedious, high and harsh ceiling conditions can be eliminated. In constructing the model, attention is paid to clean the crashes amongst the services.

A comprehensive hanger system is therefore integrated in the model. Using the RTS, the positions of the hangers are set out on-site for the soffit. With this procedure, the setting out dimensions of the model in a crash-free way can be effectively brought to the site that would warrant a smooth installation to be carried on-site later.

Nonetheless, needs exist in the construction industry for a device that combines printing and drilling to tackle the disadvantage of labor intensity and other drawbacks discussed above. In particular, there is a great need for a new printing and drilling unit that is effective for both anchor target printing and anchor hole drilling on the building surface so that an anchor can subsequently be installed in the anchor hole, thereby enabling a smooth service installation.

SUMMARY

In order to solve the above-mentioned problems of the conventional technology, an aspect of the present disclosure provides the printing and drilling system for laser printing the target and drilling the anchor hole on the building surface that is significantly more effective, economical and convenient. After the laser-marked target and anchor hole have been created, the anchor can be placed into the anchor hole by using a conventional anchoring system, or by using an anchoring system that is related to the printing and drilling system of the present disclosure.

Another aspect of the present disclosure is to provide the printing and drilling system that does not involve complicated hardware installation, thereby allowing the printing and drilling operation to perform safely and with ease.

A further aspect of the present disclosure is to use a crawler scissor lift, which is motorized to support the printing and drilling unit, and configured to allow automated or manual movements of the printing and drilling unit in various directions.

The printing and drilling system for printing and drilling the target on the building surface according to an exemplary embodiment of the present disclosure can achieve the above-mentioned aspects. More specifically, the printing and drilling system includes a supporting unit movable in x, y and z axes, and a printing and drilling unit removably secured to the supporting unit, whereby the printing and drilling unit includes one or more laser position units for illuminating a working area containing the target, an imaging unit to scan the working area of the building surface to capture images of the working area, a control unit to process the captured images, determine location coordinates of the target, and generate drilling data associated with the target, a laser generator for emitting a laser beam, a laser printing unit movable in x and y axes for emitting the laser beam generated from the laser generator to print the target, and a laser path reflector in the laser printing unit that can focus the laser beam in sequence for printing the target, and an electric drill unit movable from a first position to a second position for drilling an anchor hole on the laser-marked target.

In particular, at least two prisms are mounted to the printing and drilling unit, and X and Y coordinates of the prisms can be determined in conjunction with using a survey instrument. The determined X and Y coordinates of the prisms are wireless transmitted from the surveying instrument to the control unit, and used to locate a boundary of the 1,000×600 mm working area, thereby identifying targets within the boundary, and revealing X and Y coordinates of identified targets to the control unit.

Additionally, with the available options in the laser printing and hole drilling system to use manual drilling and priority linear drilling modes, an operator can better utilize the printing and drilling unit as a general purpose tool without needing to lean on BIM, RTS and etc., and achieve the benefits of easier handling and safer usage as compared to the conventional rotary drill system.

DRAWINGS

The advantages of the present disclosure will become more readily apparent to the ordinarily skilled in the art after reviewing the following detailed description and accompanying drawings, in which.

DETAILED DESCRIPTION

Figure 1:
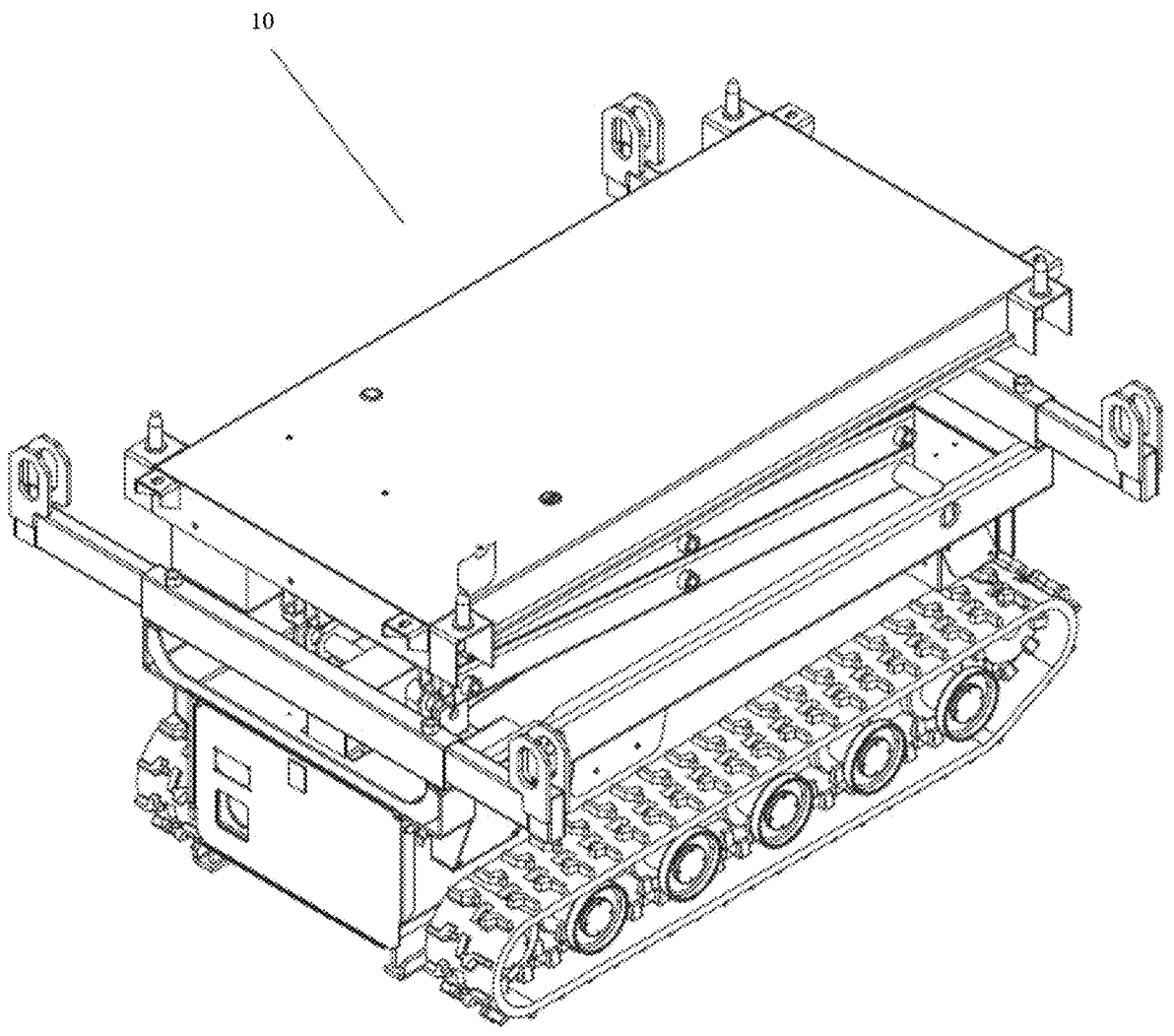
FIG. 1 is a perspective view of a crawler scissor lift.

An exemplary embodiment of a printing and drilling system for use on a building surface such as the overhead wall or ceiling slab of a building will be described in detail below with references to the accompanying drawings. It should be understood that the dimensions of the various portions in the drawings are not depicted to scale and are for illustrative purposes only and do not represent the true dimensions of the product of the present disclosure. Also, like reference numbers in the various figures of the drawings are used to designate like parts, and that the drilling system of the disclosure may be produced in many different configurations, sizes, forms and materials.

As shown in FIG. 1, a movable supporting unit in the form of a crawler scissor lift 10 is provided to allow automated or manual movements for the printing and drilling unit 12, which can be initiated in a motorized (e.g., hydraulic) or non-motorized manner. The crawler scissor lift 10 is smaller in size and easier to maneuver than a conventional scissor platform, which is a type of mobile carrier that generally facilitates the movement of worksite machines and provides a stable working platform when the worksite machines are elevated to a high level. For instance, the motorized movements of the crawler scissor lift 10 can be initiated by an operator, which can include raising or lowering all units or devices in the drilling system along the z-axis. It is clear that any suitable scissor platform can be substituted for the crawler scissor lift 10 without limitation. In other words, any suitable mobile carrier that can offer the same or similar functions can be used as a substitute.

Figure 2:
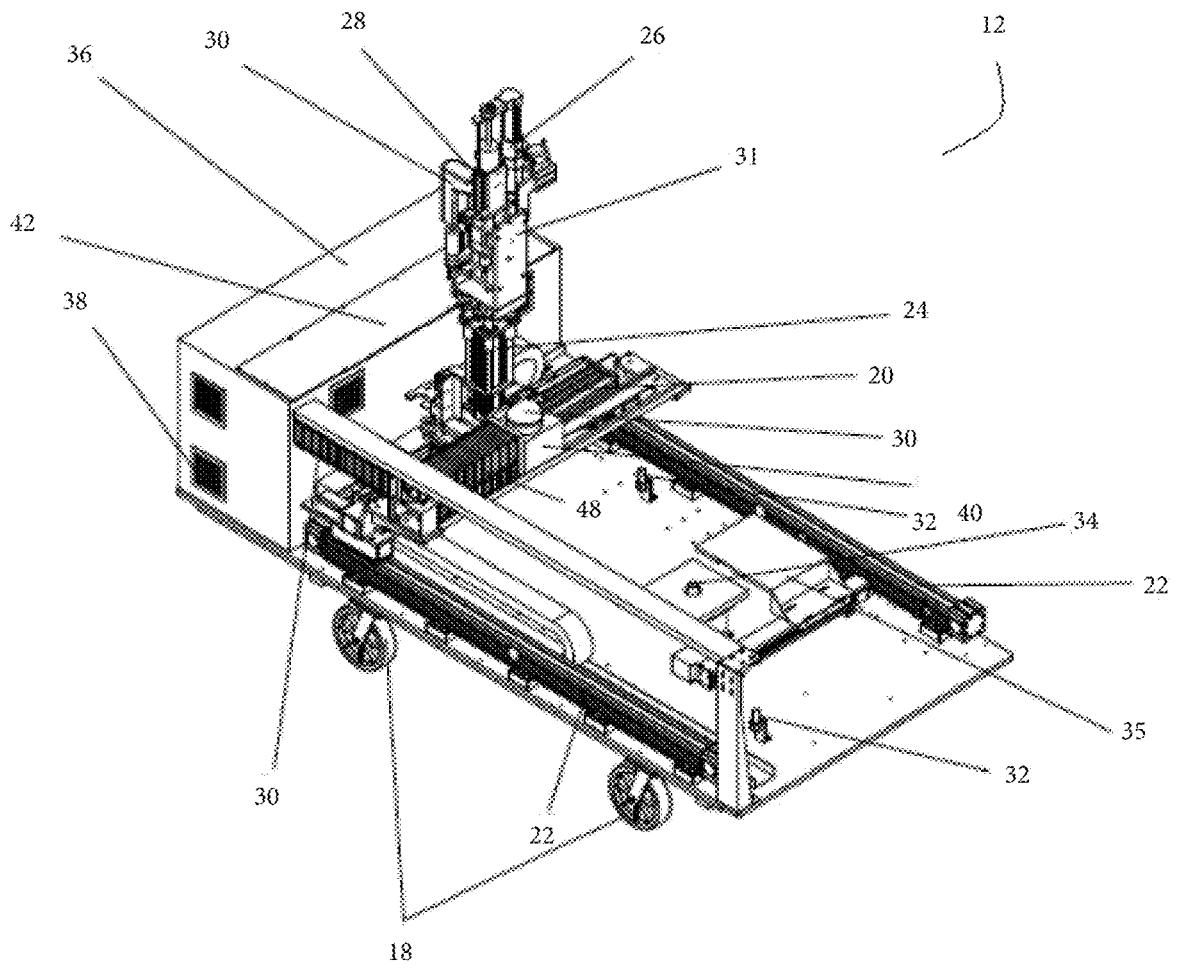
FIG. 2 is a perspective view of a printing and drilling unit according to an exemplary embodiment of the present disclosure.

As shown in FIG. 2, a printing and drilling unit 12 for printing and drilling an anchor hole at each laser-marked target on the building surface (e.g., overhead walls or ceiling slabs) according to a first exemplary embodiment is provided. The printing and drilling unit 12 allows the operator to perform automatically or manually the printing and drilling work with ease and safety for a work area in the range of 1,000×600 mm, and a ceiling height in the range of 5,500 mm. The work area generally covers multiple laser-marked targets. Prior to commence the printing and drilling operations, the printing and drilling unit 12 is securely and removably mounted onto the crawler scissor lift 10.

Figure 3:
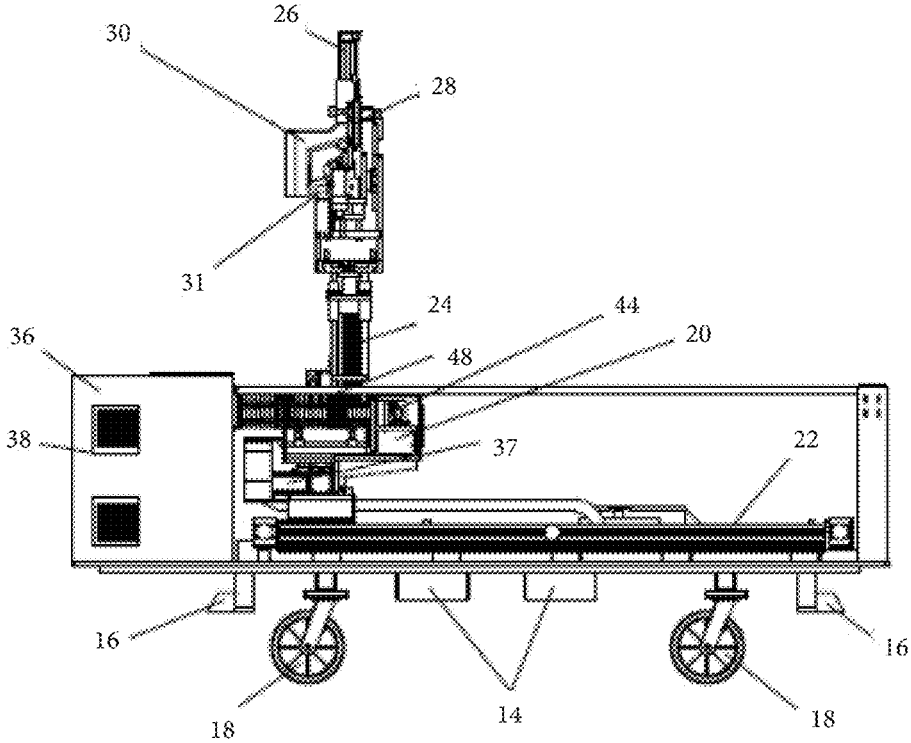
FIG. 3 is a side view of the printing and drilling unit as shown in FIG. 2.
Figure 4:
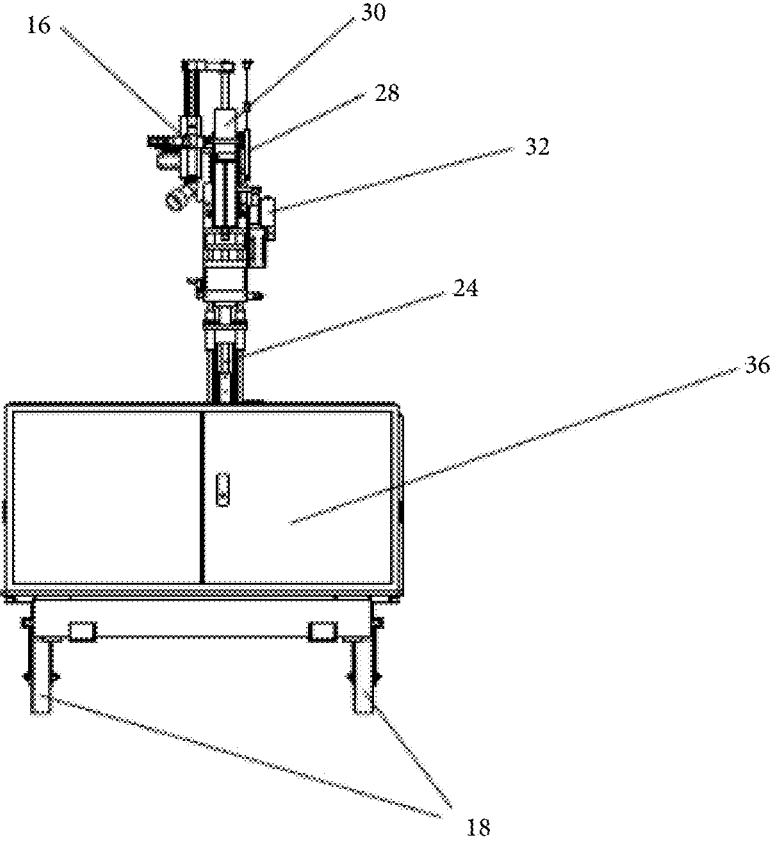
FIG. 4 is a rear view of the printing and drilling unit as shown in FIG. 2.
Figure 5:
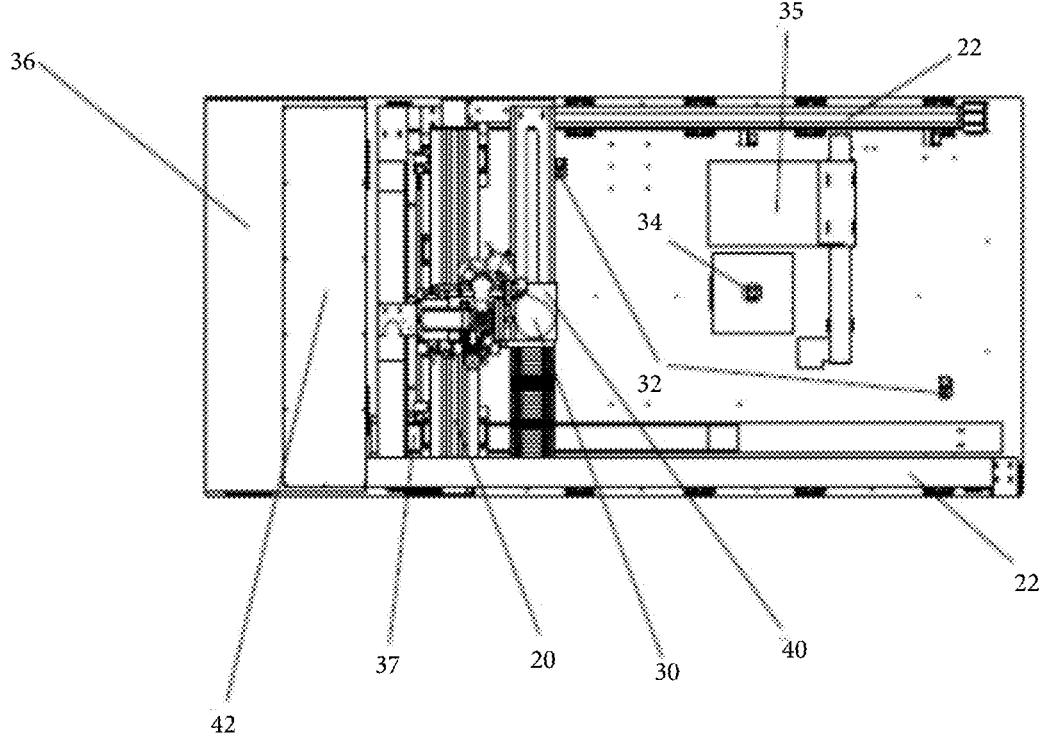
FIG. 5 is a top view of printing and drilling unit as shown in FIG. 2.

Referencing FIGS. 2 and 3, the printing and drilling unit 12 according to the first embodiment includes a pair of lifting arms 14, and one or more mounting plates 16 that removably connect the printing and drilling unit 12 to the crawler scissor lift 10. A substantial part of the crawler scissor lift 10 is approximately rectangular in shape, and can include any suitable vertical lift configured for a motorized movement for reproducing a force in a reciprocating linear motion. By lifting the printing and drilling unit 12 through the pair of lifting arms 14 up to a height of 5.5 m, and positioning the crawler scissor lift 10 underneath the printing and drilling unit 12, the upward and downward movements of the printing and drilling unit 12 can be achieved by the physical operation of the crawler scissor lift 10 through the operator. The printing and drilling unit 12, by operatively coupled or fixedly secured to the crawler scissor lift 10, can move, rotate or change directions to perform printing and drilling operations.

The printing and drilling unit 12 is supported by caster wheels 18 mounted on the bottom of the printing and drilling unit 12 enabling the movements of the printing and drilling unit 12. The caster wheels 18 can be of a rigid or swivel type, and can include a braking or locking feature that prevents the wheels from turning. Specifically, the printing and drilling unit 12 is guided by at least 4 caster wheels 18, and can be easily and conveniently transported onto the crawler scissor lift 10 by using the lifting arm 14, and securely mounted thereon by the mounting plate 16. The lifting arm 14 can be utilized through a forklift, side loader, fork truck, and etc.

Positioned in the printing and drilling unit 12 are linear actuators consisting of an x-axis linear actuator 20 with first rail grooves, a pair of y-axis linear actuators 22 each with corresponding second rail grooves, and a z-axis linear actuator 24 with third rail grooves. The pair of y-axis linear actuators 22 is spaced a distance apart, and supports the x-axis linear actuator 20 which is operatively mounted thereon. Specifically, the x-axis linear actuator 20 is capable of moving along the second rail grooves of the y-axis linear actuators 22 in the y-axis direction, and the z-axis linear actuator 24 is capable of moving along the first rail grooves of the x-axis linear actuator 20 in the x-axis direction.

An electric drill unit 30 is operatively secured over the z-axis linear actuator 24 and adjacent to a dust collecting unit 26 and a z-axis height protector 28, which limits a distance between the illuminated working area on the building surface and the electric drill unit 30 on the printing and drilling unit 12 by governing the height therebetween. The dust collecting unit 26 captures dust and debris from drilling the building surface, and channels the dust and debris to a collection area. The z-axis height protector 28 has a sensor that detects the depth of the anchor hole to be drilled so that when a predetermined depth is reached, the drilling by the electric drill unit 30 stops. The electric drill unit 30 is capable of moving along the third rail grooves of the z-axis linear actuator 24 in the z-axis direction. The electric drill unit 30 is precisely aligned to the target using an XYZ table for automatic printing and drilling, The electric drill unit 30 can particularly have a removable drill such as a hammer rotary drill that can be used as the drilling tool to form the anchor hole at the surface or soffit. When the removable drill such as the hammer rotary drill is used, it is securely fixed to a rack, and can be removed using minimum effort from its attachment to the z-axis linear actuator 24 of the printing and drilling unit 12 by detaching a control wiring, thereby allowing a simple mechanism for the operator to safely keep custody of the hammer rotary drill on the rack whenever a situational need arises. Such removal of the drill bit using minimum effort for safe keeping can be accomplished through, e.g., a fast release mechanism that allows for a quick and easy removal of the drill from the electric drill unit 30.

Additionally, a built-in load sensor with adjustable setting located in the load cell and cable mounting chamber 31 can be installed in the load cell and cable mounting chamber 31 to prevent the drill from operation when the drill hits certain hard objects, or monitor an advancing force of the drill from exceeding a limit that would render the printing and drilling unit inoperable.

As collectively shown in FIGS. 2-5, the printing and drilling unit 12 further supports a laser positioning unit 32, which is placed adjacent to the y-axis linear actuator 22, to illuminate a working area of the building surface. The printing and drilling unit 12 also has a pair of imaging units 34 for scanning the working area to capture one or more images of the working area. One or more cameras in each imaging unit are protected through an imaging camera protection cover 35 mounted over the each of the imaging units 34. The captured images are subsequently processed by a control unit 36 located at one end of the printing and drilling unit 12. One or more ventilators 38 are provided on the control cabinet 36 to allow air flowing to or from the space within the control unit 36. Specifically, the ventilators 38 are of a passive type that induces flow of external air into or out of the control unit 36.

Through the control unit 36, one or more operators can choose a set of drilling data that contains at least a corresponding drill depth and one or more drill algorithms used to drill different types of surfaces (e.g., concrete). The drill depth covers the size (e.g., diameter) of each drill. Also, the drill algorithms cover how the electrical drilling unit 30 is conducted to form the anchor hole, including an advancing force and/or speed used in the electrical drilling unit 30.

A laser printing unit 40 is mounted over the laser position system 32 for emitting laser beam generated from a laser generator 42 to print the target by, e.g. laser printing a graphic symbol with the center representing the center of the anchor hole to be drilled. The laser generator 42 can be of, e.g., a carbon dioxide lower power laser generator to emit a laser beam, which is then deflected or reflected by a laser path reflector 44 consisting of, e.g., a series of programmable mirrors, in the laser printing unit 40. More specifically, the programmable mirrors can be optical mirrors stationery fixed in a position for the purpose of deflecting the laser beam along a path. For instance, one set of the optical mirror can be positioned in the x-axis direction, and another set of the optical mirror can be positioned in the y-axis direction to deflect the laser beam to print symbols or letters on the building surface. A lens protection plate 46 is placed over the laser printing unit 40 to protect the laser printing unit 40. Along the path of the laser beam as enclosed by a laser optical path protective cover 48, a type of protective dressing material can be placed to prevent the laser beam from scattering in the surrounding areas of the path that can cause destructive damages. Additionally, the mirrors can be programmable and situated in the directions of the x and y axes so that when the laser beam reaches the laser printing unit 40, the programmable mirrors deflects the laser beam to impinge on the building surface in order to pinpoint the position of the anchor hole, and to print the various signs, symbols and/or letters as required for the anchor hole.

In order to locate the exact drilling locations on the slab or soffit, the laser beam emitted from an RTS or any other conventional laser source pointer will be used to pinpoint the position of the anchor hole, and then the laser beam generated from the laser generator 42 can be used to print the various signs, symbols and/or letters as required for the anchor hole.

In use, the printing and drilling unit 12 as collectively shown in FIGS. 2-7 is moved along the floor to a desirable location adapted for a drilling operation by an operator using the crawler scissor lift 10. Upon activation by the operator, the crawler scissor lift 10 on the supporting device ascents to cause the printing and drilling unit 12 to rise to the first (standby) position adjacent to the surface of the building to be marked. Deactivation by the user will cause the crawler scissor lift 10 on the support device to descent and thereby lowering the supporting device and printing and drilling unit 12 to an OFF position.

At the first position, the laser position unit 32 is activated to emit a laser beam that illuminates the working area of the surface. The illuminated area is designated as the working area for the predetermined printing point or laser-marked target. At this point, the working area is illuminated to allow scanning thereof by the imaging unit 34 to capture one or more images of the working area.

When the imaging unit 34 is activated, the images captured by the imaging unit 34 are directed to the control unit 36 to gather and process the captured images. One or more captured images are inspected for visualization features, such as the laser-marked target in the working area, and the inspected features are extracted. After processing the location coordinates for the laser-marked target are located, the center of the target is identified. Specifically, the x-axis and y-axis, of the location coordinates for the laser-marked target are determined by the processing unit in the control unit 36. Using these coordinates and the input drill depth and algorithms, the control unit 36 sends signals to one or more linear actuator drivers for driving one or more of the x-axis, y-axis and z-axis linear actuators 20, 22 and 24 to move the drill unit 30 from the first position to a second (active) position. For instance, a z-axis linear actuator driver 37 drives the z-axis linear actuator 24 when a signal is received from the control 36. Once the second position is reached, the drilling of the anchor hole into the laser-marked target can be initiated by the drill unit 30.

Alternatively, when the imaging unit 34 is not activated, the location coordinates for the laser-marked target as illuminated in the working area can be manually inputted into the control unit 36 through the operator. Additionally, the operator can manually direct one or more of the x-axis, y-axis and z-axis linear actuators 20, 22 and 24 to move the drill unit 30 from the first position to a second (active) position based on visualizing the laser-marked target as illuminated in the working area.

When the drill unit 30 is moved from the first (standby) position to the second (active), the longitudinal (x-axis), lateral (y-axis) and vertical (z-axis) movements of the drill unit 30 can be adjusted through first and second grooves, and the vertical movements of the drill unit 30 can be adjusted using the third grooves by taking into account of the distance as determined by the z-axis height protector 28. For instance, the electrical drill unit 30 can be pushed upward or downward in the z-axis direction through the third grooves in the z-axis linear actuator 24, moved lengthwise in the y-axis direction through the second grooves in the y-axis linear actuator 22, and moved widthwise in the x-axis direction through the first grooves in the x-axis linear actuator 20.

Generally, the drilling process for making the anchor hole will be commenced by the printing and drilling unit 12 whenever the laser point is sensed and processed, or whenever a graphic symbol made previously by a printing device or manually is sensed and processed, whereby the laser point or center of the graphic symbol is used to make the anchor hole that is mostly circular in shape. Still, the operator can further make inputs through a computer input device such as a graphics tablet that is in wired or wireless (e.g., WIFI or Bluetooth®) communication with the control unit 36, and then each of the holes can be drilled by the printing and drilling unit 12 based on the various operator inputs, which can be a designation for the predetermined printing point regarding which one of the mechanical, electrical and plumbing (MEP) services is to be installed.

When all the targets are drilled and printed, the z-axis linear actuator 24 returns the electric drill unit 30 into the original position, meaning that the printing and drilling unit 12 is returned to the first position. Thereafter, printing and drilling unit 12 will be directed to another location to repeat the drilling process.

In the above-mentioned laser printing and hole drilling system according to the present disclosure, the crawler scissor lift 10 as shown in FIG. 1 is used to support the printing and drilling unit 12. As illustrated in FIGS. 2-5, the printing and drilling unit 12 is comprised of the lifting arms 14, mounting plates 16, caster wheels 18, x-axis linear actuator 20, y-axis linear actuators 22, z-axis linear actuator 24, dust collector 26, z-axis height protector 28, electric drill unit 30, laser positioning unit 32, imaging unit 34, imaging camera protection cover 35, control unit 36, linear actuator driver 37, ventilator 38, laser printing unit 40, laser generator 42, lens protection plate 46, and laser optical path protective cover 48.

Additionally, the x-axis linear actuator 20, y-axis linear actuators 22, and z-axis linear actuator 24 are driven by the linear actuator drivers. During operation, the operator can switch the printing and drilling unit 12 from an automatic mode to a manual mode to manually control the drilling of the target on the building surface.

The control unit 36 can be of a suitable computer or programmable PLC controller, and can further include an image processing module programmed to process the captured images using machine learning to identify an impingement point of the laser light on the working area to generate the drilling data associated with the laser-marked target. The image processing module may be programed to process the captured images using a deep learning model in which the representations of the impingement point are used to train the model. The deep learning model is advantageously created by: (a) collecting image data of the captured images of the working area; (b) generating a classification indicating features of the impingement point of the laser light from the collected image data; (c) extracting a set of the features based on the image data with the classification to build the deep learning model, and (d) feeding the deep learning model train data and validation data to perform the classification to train the deep learning model to identify the impingement point in the images in a manner that an acceptable accuracy is reached for the drill data generation.

In one specific embodiment of the invention, in step (b), the working area is divided into a plurality of cells so that features representing the cell in which the impingement point is located is generated from the collected image data; in step (c), the deep learning model is built based on the features representing the cell of the impingement point; and in step (d), the deep learning model is fed with train data and validation data to perform detection of the cell of the impingement point so as to train the deep learning model to identify the impingement point in the images in a manner that an acceptable accuracy is reached for the drill data generation.

The features of the impingement point of the laser light may be determined according to actual needs and may include but not limited to brightness, size, surface area and the like.

Preferably, the deep learning model is trained to generate the drill data by the general procedures discussed below. Initially two or more sets of arbitrarily assigned weights are used in the forward propagation calculations to give calculated results on the output layer, and the calculated results are then compared with a ground truth value to obtain a deviation (i.e. a total loss value) from the ground truth value by the loss function. The obtained deviation is used to adjust the weights in the backward propagation, and the adjusted weight is used to replace the preceding weight in the forward propagation calculations. Incessant iterations of this adjustment process are made until the loss function reaches a minimum deviation from the ground truth, which is an acceptable accuracy. The model with loss function having the minimum deviation is saved for use as the deep learning model. According to the invention, the deep learning model adopts a SSD network based on the loss function which is composed of a confidence loss function and a position loss function. In other words, the loss function is defined as follows:

$$L(x, c, l, g) = \frac{1}{N}(L_{conf}(x, c) + \alpha L_{loc}(x, l, g))$$

wherein L(x, c, l, g) is total loss value; Lconf(x, c) is confidence loss function;

$L_{loc}$(x, l, g) is location loss function; N is number of samples; and α is weight;

x is feature value; c is confidence; and g is ground true.

General operational settings for the printing and drilling system in laser printing the target and drilling the anchor hole on the building surface are discussed below. In one operational setting, after the laser beam emitted by the laser positioning unit 32 (or from any laser source such as RTS) has illuminated the target on the building surface, a high definition image is taken by the imaging unit 34. Then, using a machine vision with deep learning techniques, one or more target points can be digitally identified, and the position of the laser positioning unit 32 can be located. Thereafter, while aiming the laser beam in the Z axis direction, the position of the laser printing unit 40 is moved along the x and y axes to a designation location for printing by, e.g. laser printing letters (e.g., AC, EL and etc.) that designate the use of the hole to be drilled.

In another operational setting, once the location is pinpointed by the imaging unit 34, laser printing unit 40 will move along the x and y axes to the target and print a symbol (i.e., the graphic representation of the symbol designates the intended service) with its center being the target of the drill hole on the surface. Thereafter, the electric drill 30 will automatically move along the x and y axes to drill a hole in the target. In particular, after an image is captured by the imaging unit 34, on screen in the operation panel, using the mouse, to print the position that is to be put in action manually, the drilling procedure will commence by the printing and drilling unit 12.

In yet another operational setting, the printing and drilling unit 12 can drill a series of holes along a straight line automatically in equal intervals without using the RTS. Specifically, the drilling procedure will commence by the printing and drilling unit 12 after the input of an initial position for drilling along with a figure indicating the interval distance.

In yet still another operational setting, the Intelligent Target Finding System (ITFS) is used to increase the drilling efficiency. Initially, a database (mainly a csv file) containing all points that are to be drilled is inputted to the control unit 36 in the printing and drilling unit 12. After an initial input of the coordinates of the crawler scissor lift 10 (i.e., a designated point above the present position of the crawler scissor lift 10), the system can locate all the potential points that the printing and drilling unit 12 can drill. After computation, the orientation and position of the crawler scissor lift 10 and all the potential points are shown on a map which is a full representation of all the points on that level that are to be drilled. For a convenient reference, a map can be displayed on a monitor of a handheld device for the ITFS. Once the potential targets are identified, their coordinates will be captured and extracted from the database and will be placed in an array that will be inputted into the drilling system, they then will be drilled in a sequential manner, choosing the shortest path. After the completion of the drilling process, when the crawler scissor lift 10 is moved to another location, the above procedures will be repeated.

Additionally, the printing and drilling unit 12 has four distinct modes: The first mode is a standard (default) mode for either a priority printing or a priority drilling; the second mode is for manual drilling; the third mode is for a priority linear drilling; and the fourth mode is for an intelligent target finding.

In the standard priority printing mode, the target is printed first prior to drilling. More specifically, after the emission of the laser beam to formulate a laser point, the imaging unit 34 will read the position of the laser point, using machine vision with deep learning AI technique to find the position, with the service of the hole as separately inputted. Subsequently, a second target is illuminated within the work area by the laser point emitted from the RTS. Again, the position and service will be recorded as stated above. When all the potential targets inside the work area are exhausted, for each target printing comes first then follow by drilling, procedures are as follow: The laser printing unit 40, which is situated at the base of the x and y axes to the target position, is moved along the x and y axes to start printing the graphic symbol with the center of which represent the center of the hole to be drilled. Subsequently the electric drill unit 30 is moved along the x and y axes toward the center of the symbol for drilling. The above-discussed process will repeat automatically in printing and drilling all targets that are inputted and registered inside the work area. When the whole task is completed, the drilling and printing units will each return to its homing position, the crawler scissor lift 10 is moved to another location and the abovementioned procedures are repeated.

In the standard priority drilling mode, the above-discussed procedures are followed, except that the drilling comes first, then the laser beam will print the service of the hole in letters (e.g., AC, EL, FS, etc.) next to the drilled hole, and the above procedures will repeat for each target until the task is completed.

In the manual drilling mode, the image of the building surface (overhead walls or ceiling slabs) will be captured by the imaging unit 34, with the help of a mouse, pointing to a position on screen, the event can be initiated by a mouse clicking action which can initiate an operation (drill or print mode) priority preselected.

In the priority linear drilling mode, a laser line is projected at the working area, with the input of an initial start point, and the electrical drill unit 30 can execute the drilling command automatically along the laser line at the interval between the drill points. The drilling procedures will continue after the crawler scissor lift 10 is advanced manually following the direction of the laser line.

In the ITFS mode, a database containing all points that are to be drilled are inputted to the control unit 36 in the printing and drilling unit 12. For the system to locate all the potential points that the printing and drilling unit 12 can drill at the station location of the printing and drilling unit 12, at least two prisms are installed at the designated positions of the printing and drilling unit 12, and in conjunction with using a survey instrument such as RTS, the X and Y coordinates of the prisms can be measured. Additionally, by using telemetry technique inputted to the control unit 36, i.e., using the X and Y coordinates, the orientation and position of the crawler scissor lift 10 and all the potential targets that are situated above the working areas, can be mapped out on the ITFS screen, which is a full representation of all the targets that can be drilled at that location on which the printing and drilling unit 12 is staying. In other words, the determined X and Y coordinates of the prisms are wireless transmitted from the surveying instrument to the control unit 36, and used to locate a boundary of the 1,000×600 mm working area, thereby identifying targets within the boundary, and revealing X and Y coordinates of identified targets to the control unit 36. It is noted that instead of using the prisms, other ways of measuring the distance between the printing and drilling unit 12 and targets, such as implementing a LIDAR scanner or optical surveying equipment, can be considered.

During the ITFS mode, an Automatic Guided Vehicle (AGV) function can be activated to enhance the overall efficiency. When the AGV function is used, each location of the targets to be drilled is shown on the map, and in conjunction with each shown position at which the printing and drilling unit 12 needs to be stopped and stationed, a travelling route of the printing and drilling unit 12 is revealed on the map. More specifically, various stationary locations of the printing and drilling unit 12 as represented by the X and Y coordinates of the prisms are populated on the map, then formatted into a table and inputted to the control unit 36 of the printing and drilling unit 12. By comparing the coordinates stored in the table with measured coordinates of the prisms after completing each task, e.g., in the drilling process, the printing and drilling unit 12 is moved manually to a starting position to commence work, and after completing the drilling task at the starting position, the coordinates of the prisms are automatically measured and inputted to the control unit 36, and the next position of the printing and drilling unit 12 is determined and initialized within the ITFS mode. The aforementioned sequence for the AGV function is repeated in the IFTS mode when the printing and drilling unit 12 is moved to the next position.

When all the targets are identified with their corresponding coordinates known to the control unit 36, they will be drilled sequentially, i.e., one after the other and choosing the shortest path in one process. Upon its completion, the printing and drilling unit 12 will be manually moved to another location and the above procedures will be repeated.

The above describes the printing and drilling unit of the present disclosure in detail through the exemplary embodiment for effectively drilling on a surface, e.g., overhead walls or ceiling slabs. It should be understood that the scope of the present disclosure is not limited to the above-mentioned embodiment, but is limited by the accompanying claims. Without departing from the object and spirit of the present disclosure, various modifications to the embodiment are possible, but they remain within the scope of the present disclosure.

What is claimed is:

1. A printing and drilling system for printing and drilling a target on a surface of a building comprising:
   a supporting unit movable in x, y and z axes; and
   a printing and drilling unit removably secured to the supporting unit, wherein the printing and drilling unit comprises:
      one or more laser position units for illuminating a working area containing the target,
      an imaging unit to scan the working area of the surface to capture images of the working area,
      a control unit to process the captured images, determine location coordinates of the target, and generate drilling data associated with the target,
      a laser generator for emitting a laser beam,
      a laser printing unit located at a base of a z axis and movable in x and y axes for emitting the laser beam generated from the laser generator to print the target,
      a laser path reflector in the laser printing unit that can deflect the laser beam to print one or more graphic marks as the target on the surface of the building, and
      an electric drill unit movable from a first position to a second position for drilling an anchor hole on the target.

2. The printing and drilling system of claim 1, further comprising a z-axis height protector for limiting a distance between the illuminated working area and the electric drill unit.

3. The printing and drilling system of claim 1, further comprising laser optical path protective cover to prevent the laser beam from scattering.

4. The printing and drilling system of claim 1, further comprising a dust collector unit mounted adjacent to the electric drill unit to capture dust and debris coming from drilling of the surface of the building.

5. The printing and drilling system of claim 1, further comprising a lens protection plate mounted over the laser printing unit to further protect the laser path reflector.

6. The printing and drilling system of claim 1, further comprising a ventilator on the control unit for allowing air flow to and from the control unit.

7. The printing and drilling system of claim 1, wherein the laser printing unit has a laser path reflector to reflect the laser beam for impinging on the surface of the building and pinpointing the position of the target and the laser path reflector is a set of mirrors that is programmed and arranged in a perpendicular direction within the laser printing unit to deflect the laser beam and print the graphic marks on the surface of the building.

8. The printing and drilling system of claim 7, wherein the working area is of 1,000×600 mm that covers a plurality of the targets, and the printing and drilling unit returns to a home position after the plurality of targets have been exhausted.

9. The printing and drilling system of claim 1, wherein the control unit selects a set of drilling data which contains the drill depth and drilling algorithm to provide a swift and safe operation of the printing and drilling unit.

10. The printing and drilling system of claim 1, wherein the printing and drilling unit is moved from the first position to the second position using one or more linear actuators based on the location coordinates.

11. The printing and drilling system of claim 1, wherein the laser printing unit prints the target by laser printing a graphic symbol.

12. The printing and drilling system of claim 11, further comprising an imaging camera protection cover mounted over the imaging unit to protect the imaging unit.

13. The printing and drilling system of claim 1, wherein the supporting unit is a crawler scissor lift, and the electric drill unit includes a drill that can be released from the electric drill unit.

14. The printing and drilling system of claim 13, further comprising a load cell and cable mounting chamber having a load senor with adjustable setting to prevent the drill from operation when the drill hits a hard object, or monitor an advancing force of the drill from exceeding a limit that would render the printing and drilling unit inoperable.

15. The printing and drilling system of claim 1, wherein the printing and drilling unit can operate in multiple modes that include a standard mode for priority printing or priority drilling, a manual mode, a priority linear drilling mode, and an intelligent target finding mode, with the printing and drilling processes combined in one operation.

16. The printing and drilling system of claim 1, wherein the control unit includes a database containing of target coordinates inputted from an Intelligent Target Finding System to increase the drilling efficiency.

17. The printing and drilling system of claim 1, wherein at least two prisms are mounted to the printing and drilling unit, and X and Y coordinates of the prisms are determined in conjunction with using a survey instrument.

18. The printing and drilling system of claim 17, wherein the determined X and Y coordinates of the prisms are wireless transmitted from the surveying instrument to the control unit.

19. The printing and drilling system of claim 17, wherein the determined X and Y coordinates of the prisms are used to locate the boundary of the 1,000×600 mm working area, thereby identifying targets within the boundary, and revealing X and Y coordinates of identified targets to the control unit.

20. The printing and drilling system of claim 1, wherein the control unit comprises an image processing module programmed to process the captured images using machine learning and deep learning techniques to identify an impingement point of the laser light on the working area to generate the drilling data associated with the target.

21. The printing and drilling system of claim 20, wherein the machine learning consists of a deep learning model, which is created by:
   a) collecting image data of the captured images of the working area,
   b) generating a classification indicating features of the impingement point of the laser light from the collected image data,
   c) extracting a set of the features based on the image data with the classification to build the deep learning model, and
   d) feeding the deep learning model train data and validation data to perform the classification to train the deep learning model to identify the impingement point in the images in a manner that an acceptable accuracy is reached for the drill data generation.

22. The printing and drilling system of claim 21, wherein steps b) and c) comprise:

dividing the working area into a plurality of cells and generating features representing the cell in which the impingement point is located from the collected image data, building the deep learning model based on the features representing the cell of the impingement point, and feeding the deep learning model train data and validation data to perform detection of the cell of the impingement point to train the deep learning model to identify the impingement point in the images in a manner that an acceptable accuracy is reached for the drill data generation.

23. The printing and drilling system of claim 21, wherein the deep learning model is based on a SSD network model, which defines a loss function as follows:

$$L(x, c, l, g) = 1/N(\text{L\_conf}(x, c) + [\alpha L]\_\text{loc}(x, l, g))$$

wherein L(x, c, 1, g) is total loss value; Lconf(x, c) is confidence loss function; Lloc(x, 1, g) is location loss function; N is number of samples; and $\alpha$ is weight; x is feature value; c is confidence; and g is ground truth.

* * * * *